B. S. ROBERTS.

Breech Loading Fire Arm.

No. 3,562. Reissued July 20, 1869.

Witnesses:
R. T. Campbell.
Edw. Schafer.

Inventor:
B. S. Roberts.
by
Mason, Fenwick & Lawrence

N. PETERS, Photo-Lithographer, Washington, D. C.

UNITED STATES PATENT OFFICE.

B. S. ROBERTS, OF THE UNITED STATES ARMY.

IMPROVEMENT IN BREECH-LOADING FIRE-ARMS.

Specification forming part of Letters Patent No. 65,607, dated June 11, 1867; Reissue No. 3,562, dated July 20, 1869.

*To all whom it may concern:*

Be it known that I, B. S. ROBERTS, of the United States Army, have invented a new and Improved Breech-Loading Fire-Arm; and I do hereby declare that the following is a full, clear, and exact description thereof, reference being had to the accomanying drawings, making a part of this specification, in which—

Figure 1:
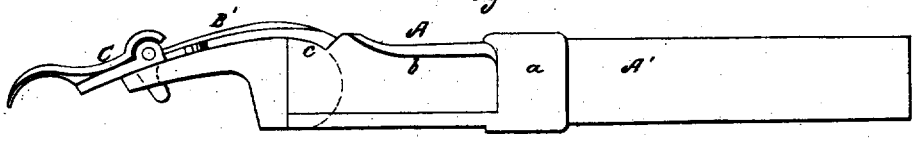
Figure 2:
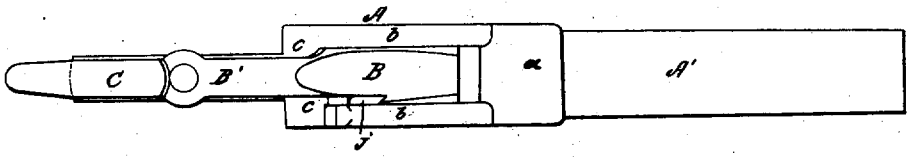
Figure 3:
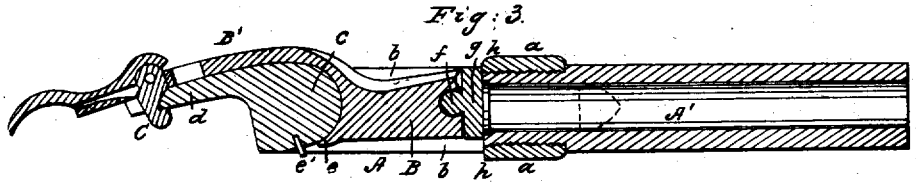
Figure 4:
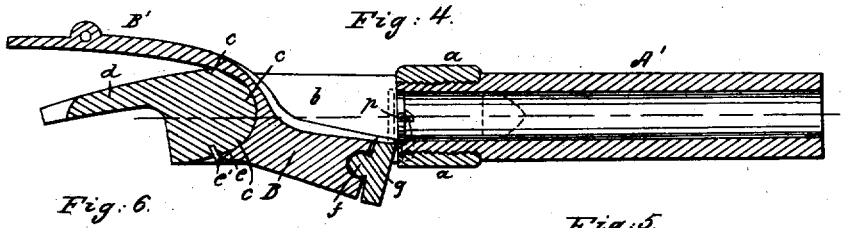
Figure 6:
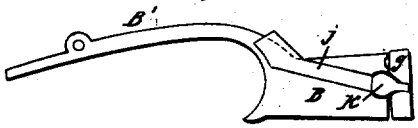
Figure 5:
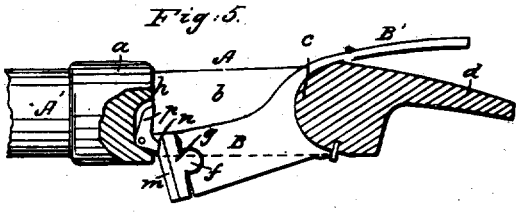

Figure 1 is a side view of my invention applied to the breech-frame and a portion of the barrel of the fire-arm. Fig. 2 is a top view of the improved arm. Fig. 3 is a longitudinal section taken vertically through the center of the arm, showing the breech-plug in position for firing. Fig. 4 is a similar view of the same parts, with the breech-plug thrown down to expose the breech of the barrel. Fig. 5 is a sectional view, showing the devices for extracting the cartridge-shells from the barrel. Fig. 6 is a view of one side of the breech-plug and recoil-shield, showing the application of the firing-pin to them.

Similar letters of reference indicate corresponding parts in the several figures.

One object of this invention is to employ a breech-plug which swings about a solid curved abutment formed on the frame to which the barrel is secured, and to apply to the front end of this breech-plug a rocking recoil-shield having a flat forward face, which will fit squarely against the breech end of the barrel when in line therewith, and which will allow of the swinging of the breech-plug in the act of opening and closing the rear end of the barrel, as will be hereinafter described.

Another object of my invention is to employ a sliding firing-pin in conjunction with a swinging breech-plug having a rocking recoil-shield applied to its front end, said firing-pin being so arranged as to transmit the blow of the hammer upon it to the flange of the cartridge and ignite the powder therein, as will be hereinafter described.

Another object of my invention is to effect the extraction of flanged cartridge-shells from the barrel at the moment the breech-plug is moved to a position for allowing of the escape of the shell by having a portion of the rocking recoil-shield on the breech-plug strike one arm of a pivoted extractor, which is arranged on one side of the barrel, and lies in front of the flange of the shell at such moment, as will be hereinafter described.

Another object of my invention is to apply to a rear extension of the swinging breech-plug a spring-catch having a rear lever-extension formed on it, said catch being so arranged that it will engage with the tang of the frame of the arm when the breech-plug is moved in a position for firing, and positively hold the plug against casual displacement, as will be hereinafter explained.

Another object of my invention is to so arrange a breech-plug which swings bodily about a solid curved abutment formed on the frame of the arm that when this plug is in position for firing the gun it shall be centrally located with respect to the axis of the barrel, and have no tendency to be moved out of such position by reason of the force of the gas when the gun is fired, as will be hereinafter explained.

In the accompanying drawings, A represents a solid breech-frame, consisting of the re-enforce *a*, into which the rear end of the barrel A′ is screwed, for giving strength to the barrel at this point, two parallel cheeks, *b b*, between which the breech-plug is supported laterally, and a solid abutment, *c*, which has its front face rounded concentric to the axis of motion of the breech-plug, and which terminates in a tang, *d*, to which the lever-latch is connected.

Within the space formed between the two cheeks *b b* of frame A is a breech-plug, B, the rear end of which is concave, so as to fit snugly and move upon the corresponding convex surface, *c*, and from the upper portion of this concave end a curved lever, B′, extends backward, and when down in place, as shown in Fig. 3, fits snugly upon the upper solid faces of abutment *c* and tang *d*, as shown in Figs. 1 and 3. The lower rear corner of the breech-plug B terminates in a lip, *e*′, which, when the breech-plug is fully depressed, as shown in Figs. 4 and 5, will strike against a stop, *e*′, on the abutment *c*, and thus prevent farther descent of said breech-plug. The breech-plug is thus caused to move bodily about a concentric abutment, thus affording great strength and admitting of the use of a very short breech-plug. The forward end of the breech-plug B has a semicircular groove formed transversely in it, for receiving a corresponding tenon, *f*, which is formed on a recoil-shield, *g*, as shown in Figs. 3, 4, and 5. The front face of the shield *g* is flat, so that when it is adjusted in the position shown in Fig. 3 this flat face will fit squarely against the vertical face *h*, and also against the butt-end of the cartridge-shell. A sufficient space is left between the rear surface of the shield *g* and front surface of the breech-plug B to allow this shield a rocking movement independent of its plug, so that when the front end of the latter, B, is depressed to expose the breech of the barrel A′ the shield *g* will move perpendicularly downward for a short distance, and then swing in the arc of a circle with the breech-plug B. In ascending to its former position shield *g* makes the same movement, as described. The distance from the axis of motion of the breech-plug B to the center of the front end of the rocking shield *g* should be equal to the distance from said axis to a point touching the center of the butt of the cartridge-shell when the latter is in place, as shown in red, Fig. 3. This renders it necessary to leave such a space between the plug B and shield *g* as will allow the upper end of the latter to recede as it descends.

The position of the breech-plug B when held down by the latch C, as shown in Fig. 3, is such that the recoil of the discharge is received directly and centrally upon the solid abutment *c*. The upper surfaces of the breech-plug and rocking shield are grooved longitudinally, so as to allow space in rear of the barrel, when the plug B is depressed, for the backward escape of the cartridge-shell, and also for the insertion of a ball-cartridge. On one side of the breech-plug B an inclined groove is formed, in which is inserted a firing-pin, *j*, upon the upper end of which the hammer strikes. The lower end of this pin *j* abuts against a wedge-shaped pin, *k*, which is fitted into a recess formed in the rocking shield *g*, as shown in Fig. 6. Pin *k* is allowed to have a slight endwise movement in its recess, so that when struck by pin *j* its front end will strike the flange of the cartridge and ignite the powder therein. This pin *k* is also allowed to rock with the shield *g* in opening and closing the breech of the barrel. On the opposite shield *g* a groove, *m*, is made, leaving a lip, *m*, and in this groove the lower end of an extracting lever-plate, *p*, lies. This plate *p* is pivoted in a recess formed in one side of a barrel, so that its upper end shall lie closely in the annular groove which is made in the barrel to receive the flange on the cartridges. The upper end of lever-plate *p* is thus arranged in such a position that when a cartridge is inserted in the rear end of the barrel the extracting portion of said plate will fall in front of the flange on this cartridge. When lever B′ is suddenly raised, the lip *n* will strike the lower projecting end of the plate *p*, and thus thrust backward the upper end of this plate, and with it the cartridge-shell.

It will be seen by reference to Fig. 5 that the slot *m* in the side of the shield will allow this shield to be depressed until its upper grooved edge is below the plane of the cartridge-shell to be extracted, at which moment the lip or shoulder *n* will strike the rear arm of the extractor *p* and eject the shell, or so loosen it in its chamber as to allow it to drop out.

It will also be seen that the breech-plug B is constructed so that it can be moved bodily in the arc of a circle, concentric to its solid abutment *c*. Thus by a short movement on a short plug the breech end of the barrel can be exposed to receive a cartridge or closed to fire the gun. The curves at the rear end of the breech-plug B and at the front side of the abutment *c* are such that when said plug is depressed to a proper position it can be taken out of its chamber; and the axis or center of said curves is so arranged with reference to the plan of the axis of the barrel A′ that the forces of the gas, when the gun is fired, have no tendency to throw said plug out of place.

The lever-latch C, which is pivoted near the rear end of the extension B′ of the breech-plug B, consists of a hooked catching portion adapted to catch under the rear beveled end of the tang *d*, a curved lever portion, which serves as a handle or finger-piece, and a spring, which is arranged so as to press the catching forward, so that when the extension B′ is pressed down to bring the breech-plug home for firing the gun the catch will engage with the tang *d* and hold said plug in place.

Having described my invention, what I claim as new, and desire to secure by Letters Patent, is—

1. In combination with a breech-plug, B, which swings about a curved abutment, *c*, a rocking shield, *g*, so applied to said breech-plug as to allow the opening and closing of the breech of the barrel for the insertion and withdrawal of a cartridge, substantially as described.

2. The lever B′, formed on the rear curved end of a swinging breech-plug, B, and adapted to move about the solid abutment *c*, in combination with a rocking block, *g*, which will admit the opening and closing of the breech, substantially as described.

3. The lever-extractor *p*, arranged on one side of the barrel, and having one of its arms arranged in a recess in the recoil-shield, so as to be acted upon by the shoulder *n* at the upper termination of said recess, substantially as described.

4. The curve *c c c* at the rear of the cheeks containing the breech-plug B, when formed substantially as described, and so that the force of the gas, when the gun is fired, shall have no tendency to throw the breech-plug out of its place, as set forth.

5. A bodily swinging breech-plug, B, having a rear extension, B′, and a lever-latch, C, constructed substantially as described.

Witnesses: B. S. ROBERTS.

JULIUS HIRSCH,

R. T. CAMPBELL.